United States Patent

(12) United States Patent
Avrutsky

(10) Patent No.: US 7,262,845 B2
(45) Date of Patent: Aug. 28, 2007

(54) DIFFRACTIVE IMAGING SPECTROMETER

(75) Inventor: Ivan Avrutsky, Troy, MI (US)

(73) Assignee: Wayne State University, Detroit, MI (US)

( * ) Notice: Subject to any disclaimer, the term of this patent is extended or adjusted under 35 U.S.C. 154(b) by 337 days.

(21) Appl. No.: 10/857,354

(22) Filed: May 27, 2004

(65) Prior Publication Data

US 2005/0068526 A1    Mar. 31, 2005

Related U.S. Application Data

(60) Provisional application No. 60/473,958, filed on May 27, 2003.

(51) Int. Cl.
*G01J 3/28*    (2006.01)
(52) U.S. Cl. .................................... 356/328
(58) Field of Classification Search ............... 356/328; 398/9
See application file for complete search history.

(56) References Cited

U.S. PATENT DOCUMENTS 5,026,160 A * 6/1991 Dorain et al. ............... 356/328
6,081,331 A * 6/2000 Teichmann ................. 356/328
6,303,934 B1 * 10/2001 Daly et al. ............. 250/339.02

FOREIGN PATENT DOCUMENTS

WO    WO92/11517    7/1992

OTHER PUBLICATIONS

Liao, et al.,Demonstration of guided-wave optical fan-out using waveguide diffractive optical system, *Optics Communications* 137 (1997) 1-5.
Sander, et al., Selffocussing phase transmission grating for an integrated optical microspectrometer, *Sensors and Actuators* A 88 (2001) 1-9.
Yee, et al., Miniature spectrometers for biochemical analysis, *Senators and Actuators* A 52 (1997) 61-66.

* cited by examiner

*Primary Examiner*—Gregory J. Toatley, Jr.
*Assistant Examiner*—Kara Geisel
(74) *Attorney, Agent, or Firm*—Rohm & Monsanto, PLC

(57) ABSTRACT

A miniaturized diffractive imaging spectrometer (DIS) has a footprint less than 2×1 $mm^2$, is about 2.5 mm tall (excluding an image detector, which in some embodiments may be a CCD matrix), and covers the entire visible spectral range from 400 nm to 700 nm with resolution of approximately from 2 nm to 4 nm across the field. The DIS is able to function with multiple input waveguide channels, and is flexible in its various possible configurations, as it can be designed to achieve better resolution or higher number of channels or wider spectral range or smaller size.

12 Claims, 5 Drawing Sheets

DIFFRACTIVE IMAGING SPECTROMETER

RELATIONSHIP TO OTHER APPLICATION(S)

This application claims the benefit under 35 U.S.C. § 119 of provisional application 60/473,958 filed on Mar. 27, 2003.

BACKGROUND OF THE INVENTION

1. Field of the Invention

This invention relates generally to spectral devices for applications such as lab-on-a-chip for biological and chemical analysis, and more particularly, to a Diffractive Imaging Spectrometer ("DIS") in the form of a highly compact device, which takes multiple optical input signals from input channel waveguides, and produces a spectrally resolved image, covering a wide spectral range with high resolution.

2. Description of the Related Art

Small scale spectral devices are required for applications, such as lab-on-a-chip, for biological and chemical analysis. The integration of microfluidics, microelectronics, and integrated optics on a single chip or wafer is essential for the practical implementation of a micro total analysis system ($\mu$TAS), for example. Reduced overall size and weight are also essential factors for experimental research tools used in space and aircraft-based laboratories.

For biological or chemical applications, fluorescence and absorption spectroscopy are the main types of optical measurements required for $\mu$TAS applications. Unfortunately, small footprint spectrometers have low resolution. To date, various schemes have been proposed for producing high-resolution optical spectrometers. However, these devices still have unacceptably large footprints, typically on the order of about several square centimeters. Microspectrometers that would be acceptable for $\mu$TAS applications must have footprints that are two orders of magnitude smaller, while still covering a wide spectral range of several hundred nanometers and having a resolution on the order of single nanometers. Moreover, the development of a practical $\mu$TAS requires a device that has the ability for parallel processing of multiple optical inputs. There is not presently available, a microspectrometer having the aforesaid features.

There is therefore a need for an analytical spectral device that is highly compact and low in weight. It is important that the reduction in size and weight not affect adversely limit the ability of the device to receive input from multiple sources, or to limit its resolution.

It is, therefore, an object of this invention to provide a highly compact DIS.

It is another object of this invention to provide a DIS that can receive multiple optical input signals from input channel waveguides.

It is also an object of this invention to provide a DIS that can cover a wide spectral range with high resolution.

It is a further object of this invention to provide a DIS that can easily be optimized for a particular application.

SUMMARY OF THE INVENTION

The foregoing and other objects are achieved by this invention which provides a diffractive imaging spectrometer in the form of a highly compact device that can receive multiple optical input signals from input channel waveguides, and produces a spectrally resolved image, covering a wide spectral range with high resolution.

In a broad embodiment of the invention, a DIS comprises:
an input for receiving an input optical signal;
a diffractive optical element for collimating the input optical signal, subjecting the input optical signal to a diffraction grating, and producing a focused output signal; and
a focusing surface on which an output image responsive to the focused output signal is produced.

The input for receiving an input optical signal comprises a plurality of waveguide channels etched or otherwise formed in a planar waveguide for collimating the input optical signal. The plurality of waveguide channels are arranged to propagate respective input optical signals to the diffractive optical element. The diffractive optical element includes a diffraction grating for producing a focused output signal. The diffraction grating is a set of curved grooves or areas with modified refractive index in the planar waveguide.

The diffractive optical element is designed to provide ideal focusing of optical radiation at wavelength $\lambda_0$ from the central waveguide channel to a focal spot located at a distance H directly above the diffractive optical element. In a practical embodiment, the space between the waveguide and the focal spot, or the waveguide expansion section, is filled with high index (n) material to improve diffraction divergence of the focused radiation.

The plurality of waveguide channels are separated from one another to achieve separation of focused output signals, or spectra, at the focusing surface.

In this embodiment, the focusing surface comprises an aberration correction prism since diffractive optics are known to suffer from high chromatic aberrations. The aberration correction prism includes a focusing plane at a surface arranged to receive the focused output signal so as to produce an output image. The focusing plane is arranged at an optimized angle, $\theta$, with respect to the diffractive optical element.

In preferred embodiments, the optimized angle with respect to the diffractive optical element is approximately between 45° and 60°, and most preferably approximately between 51° and 55°. In a specific illustrative embodiment, the optimized angle is 53°.

Of course, the optimal angle of the prism and the size of the diffractive optical element may be varied in accordance with the principles of the invention depending on the desired spectral range, resolution, modal index of the waveguide, dispersion of the waveguide, index of the prism, etc.

The DIS further includes an image sensor having an input for receiving the output image from the focusing surface and an output for producing an image electrical signal responsive to the output image. In preferred embodiments, the image sensor is an array of photodetectors, such as a charge coupled device (CCD), or a complimentary metal-oxide-semiconductor (CMOS) image sensor. In a preferred practical embodiment of the invention, the aberration correction prism is arranged to provide mechanical support for the image sensor.

In a specific illustrative embodiment of the invention, a DIS has a footprint less than 2×1 mm², is about 2.5 mm tall (excluding the image sensor, which in may be a CCD matrix), covers the entire visible spectral range from 400 nm to 700 nm with resolution of approximately from 2 nm to 4 nm across the field. In addition, a DIS in accordance with the invention is able to function with 35 input waveguide channels. The DIS is flexible in its various possible configurations, as it can be designed to achieve better resolution or higher number of channels or wider spectral range or smaller size.

BRIEF DESCRIPTION OF THE DRAWING

Comprehension of the invention is facilitated by reading the following detailed description, in conjunction with the annexed drawing, in which.

DETAILED DESCRIPTION

Figure 1:
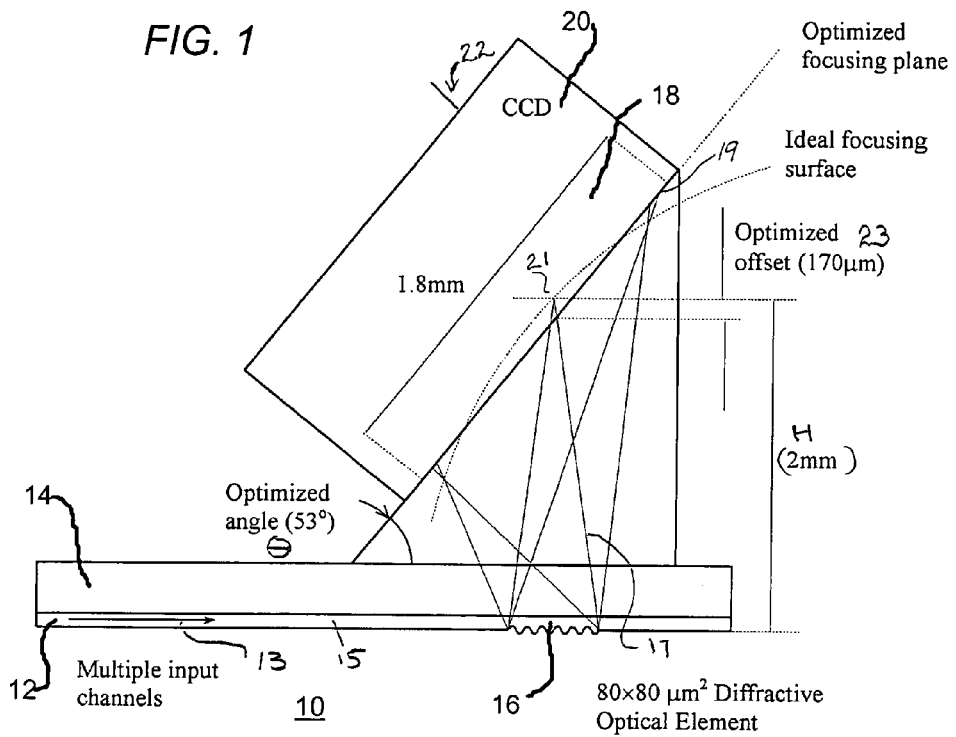
FIG. 1 is a simplified schematic representation of a side view of a DIS constructed in accordance with the principles of the invention.

FIG. 1 is a simplified schematic representation of a side view of DIS 10 constructed in accordance with the principles of the invention. As shown in this figure, DIS 10 has N input waveguide channels 12, a planar waveguide expansion section 14, a diffractive optical element 16, an aberration correction prism 18, and an image sensor 20. In this particular embodiment, the image sensor is illustratively a Charge Coupled Device (CCD).

The input optical signals 13 travel through waveguide channels 12 in planar waveguide 15 that also contains diffractive optical element 16. Diffractive optical element 16 produces focused output signals 17 that impinge on a focusing surface 19 on aberration correction prism 18 to produce an output image 21 responsive to the focused output signal. The image sensor 20, illustratively a CCD which is an array of photodetectors, or inputs, not specifically shown in this figure, receives the output image(s) and produces at an output 22, an image electrical signal responsive to the output image.

Figure 2:
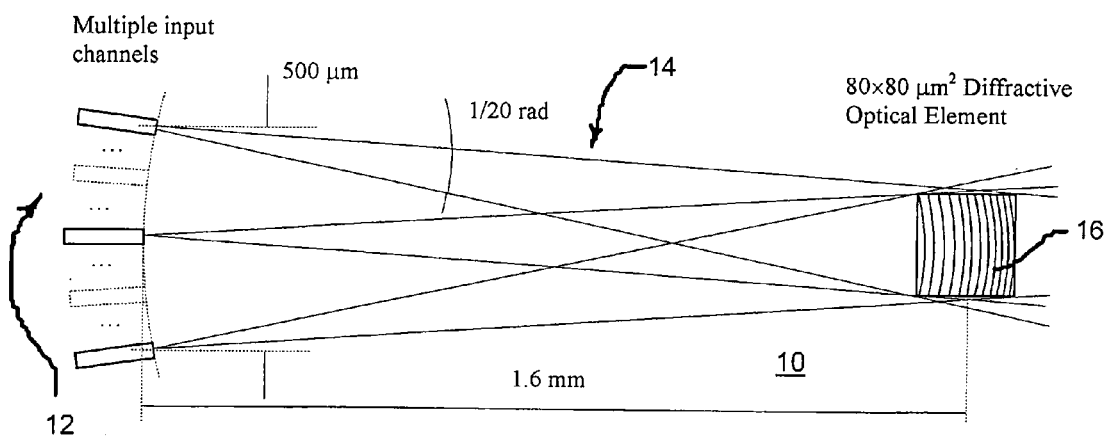
FIG. 2 is a simplified schematic representation of a planar portion of the DIS of FIG. 1.

FIG. 2 is a simplified schematic representation of a planar portion of the DIS of FIG. 1. Elements of structure that have previously been discussed are similarly designated. Input waveguides 12 are shown to be facing diffractive optical element 16. They are physically separated to achieve clear separation of spectra at the image sensor (not shown in this figure). Exact distances from the input waveguides to the diffractive optical element are optimizable. At first approximation, the waveguide ends are located along a circle of radius R centered at the center of the diffractive optical element. To achieve optimal power efficiency, the angular divergence of the radiation coming out of the waveguides is close to the angular size of the diffractive optical element at distance R.

Referring back to FIG. 1, expansion section 14 is a uniform planar waveguide. Compared to free-space optics, a waveguide-based design allows for a more compact design due to light confinement within the waveguide. The use of high modal index ($n_m$) waveguides in the present invention results in a denser structure of the diffractive optical element, which results in further reduction of the system dimensions.

The key element of the DIS is diffractive optical element 16. It combines functions of an input collimating optics, a diffraction grating, and an output focusing optics. Physically, it is a set of curved grooves or areas with modified refractive index in a planar waveguide. The diffractive optical element is designed to provide ideal focusing of the radiation at wavelength $\lambda_0$ coming out of the central waveguide channel to a focal spot located at a distance H directly above the diffractive optical element. Normal output direction is a logical choice as long as it provides the largest visible angular size of the diffractive optical element and, thus, the best diffraction limited convergence of the radiation.

The space between the waveguide and the focal spot is filled with high index (n) material to improve diffraction divergence of the focused radiation. The diffractive optics is known to suffer from high chromatic aberrations. In order to reduce the effect of chromatic aberrations, the diffractive optical element has a small size, but is sufficient to provide the necessary spectral resolution. For example, in a specific illustrative embodiment of the invention, for the wavelength $\lambda_0$ the required resolution is $\delta\lambda$, the diffractive element contains approximately $M=\lambda_0/\delta\lambda$ grooves, and its length is determined by $L=M\lambda_0/n_m=\lambda_0^2/(\delta\lambda \cdot n_m)$. In view of this teaching, persons of ordinary skill in the art can determine an appropriate exact size for a diffractive optical element.

The size of the diffractive optical element determines the appropriate separation between the input waveguide channels. Assuming a square shape for the diffractive optical element, one obtains the optimal angular divergence of the radiation coming out of the waveguide channels from the relationship: $\alpha=L/R$. Then, the lateral mode size at wavelength $\lambda_0$ is determined to be approximately $d=\lambda_0/\alpha n_m$. The waveguide separation (center-to-center distance) must be, on the order of twice that size to provide clear separation of the spectra corresponding to different inputs. Finally it becomes $d_w=2R\delta\lambda/\lambda_0$. It is to be noted that the analytical estimation of the total number of channels is not trivial. It is easier to check the simulated intensity distribution at the image sensor plane and find the location of the most remote input waveguide channel, which is still imaged with reasonably low aberrations.

For a given diffractive optical element, which provides focusing of radiation with wavelength $\lambda_0$ to a focal spot right above it on the focusing surface 19, the radiation of different wavelengths will be focused to the focal spots located at some surface above the diffractive optical element. Referring to FIG. 1, aberration correction prism 18, with optimized angle $\theta$, is placed between diffractive optical element 16 and the image sensor 20. The prism also provides a mechanical support for image sensor 20 in this embodiment of the invention. The exact prism angle $\theta$ and the prism location (e.g., offset between the ideal focal spot for $\lambda_0$ and the prism facet, or focusing surface) is optimizable for particular applications. Chromatic dispersion of the prism's refractive index must be taken into account in an accurate design.

Image sensor 20, which may be a charge coupled device (CCD) or a complimentary metal-oxide-semiconductor (CMOS) image sensor, is located at the prism surface. Its pixel size, s, must be small enough to resolve the focal spots produced by monochromatic radiation at the image sensor plane. At the wavelength $\lambda_0$ one obtains an estimation of $s<(H/\cos(\theta))(n_m/n)(\delta\lambda/\lambda)$. Practically, it must be several times smaller to provide reliable resolution and account for smaller angular dispersion possible at wavelengths longer than $\lambda_0$.

Illustrative Embodiment of the Diffractive Imaging Spectrometer

This section presents a specific example of a DIS, which was designed to cover the entire visible spectrum range from 400 nm to 700 nm. The optimal design wavelength $\lambda_0$ was found to be 480 nm. This wavelength was the result of a numerical optimization. However, choice of $\lambda_0$ is not important. Diffraction-limited resolution was chosen to be $\delta\lambda=2$ nm. It was assumed that geometrical aberrations will deteriorate this number so that, finally, there will be a resolution of about 3 nm to 4 nm across the entire spectrum for all the input channels.

The waveguide's modal index is assumed to be $n_m=1.55$, and the prism index is $n=1.50$ (glass). The material dispersion was neglected in this simplified design example.

According to the teaching hereinabove, the diffractive optical element size of the specific illustrative embodiment of the invention becomes approximately L=80 μm.

The size of input waveguide channels was chosen to be close to the typical single fiber core size, that is, 6.5 μm. This results in a waveguide separation (center-to-center) of 13 μm and the radius is then determined to be R≈1.6 mm.

The image of the input waveguide facet at the sensor plane defined by geometrical optics rules is magnified by a factor H/R. Thus, it is determined that H=2 mm in order to achieve the geometrical image size of about 8 μm, which is approximately two times larger than the pitch of a dense CCD matrix. Further numerical optimization of the image size location yields an offset 23 of about ~170 μm and optimal angle θ=53°.

Figure 3:
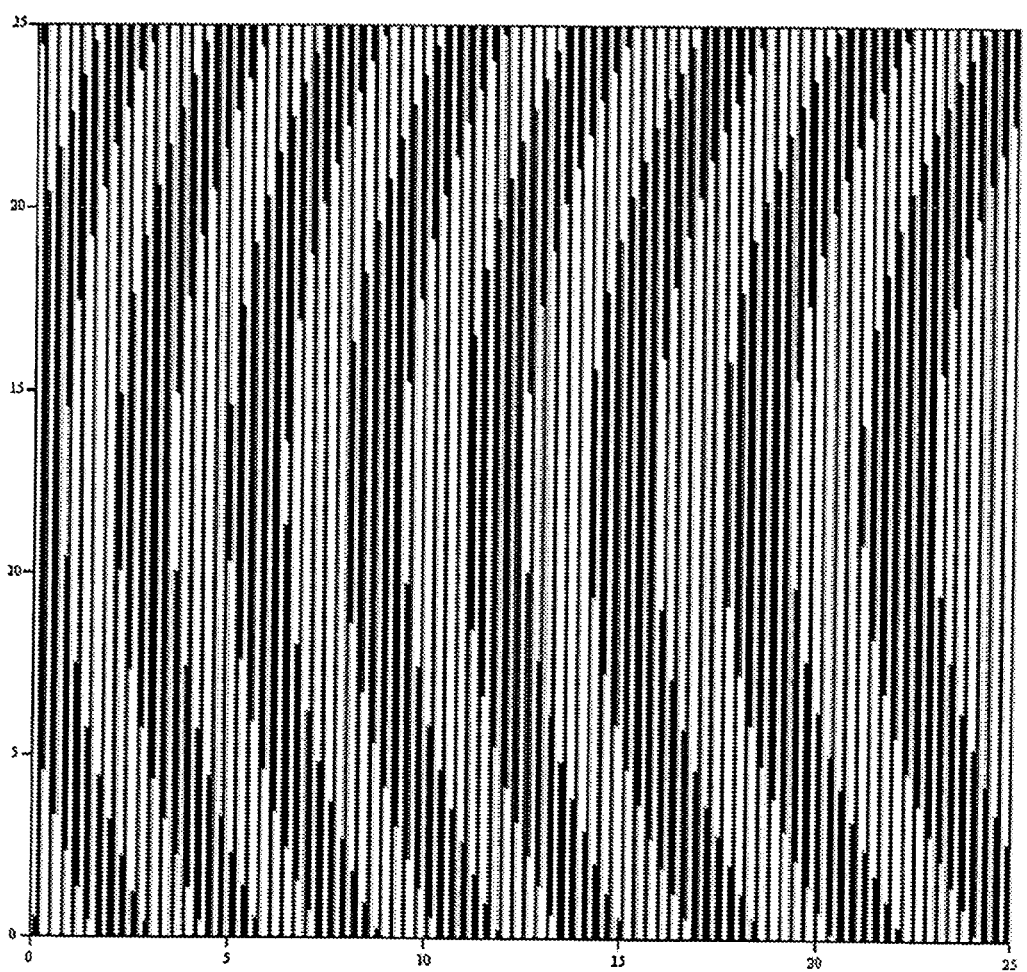
FIG. 3 is a simplified schematic representation of the central portion (25×25 µm²) of a diffractive optical element that is useful in the implementation of the DIS of FIG. 1.

The structure of the diffractive optical element is determined by the interference pattern of two diverging waves. One of them has an origin at the facet of the central input waveguide, and the second one is centered at a distance H above the diffractive optical element. The vacuum wavelength of both waves is $\lambda_0$, and the refractive indexes are $n_m$ and n, respectively. The typical period of the interference pattern is $\lambda_0/n_m \approx 320$ nm. Then, assuming electron beam fabrication, a digitized binary picture is developed with pixel size of 100 nm. A central 25×25 μm² portion of the diffractive optical element is shown in FIG. 3, which is a simplified schematic representation of the central portion (25×25 μm²) of a diffractive optical element that is useful in the implementation of the DIS of FIG. 1.

Figure 4:
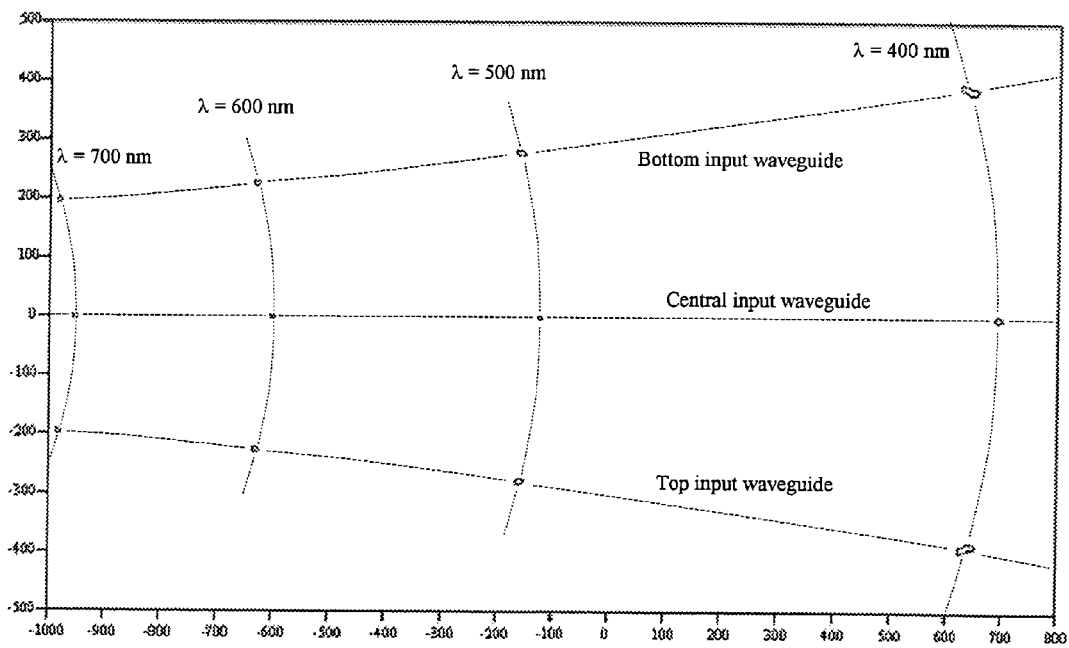
FIG. 4 is a graphical representation of the intensity distribution at the image sensor of the DIS of FIG. 1.

Intensity distribution at the image sensor is calculated using the Fraunhofer approximation. FIG. 4 is a graphical representation of the intensity distribution at the image sensor 20 of the DIS of FIG. 1, and illustrates the intensity distribution produced by the radiation with wavelengths 400 nm, 500 nm, 600 nm, and 700 nm propagating to the diffractive optical element from the central input waveguide and two other input waveguides located at ±250 μm with respect to the central one. The horizontal lines show the focal spot locations for the radiation propagating out of a given input waveguide. The vertical lines show the locations of the focal spots for the radiation with given wavelength. The spots are shown at the half intensity level. The optimization goal was to get the spots as small as possible while keeping them well separated. From the spot sizes, spectra from up to 35 input channels can be analyzed by this device. Wavelength resolution varies between 2 nm and 4 nm across the image field. Overall image field size is 0.8×1.7 mm². The optical portion of the DIS has a rather small footprint. In this specific illustrative embodiment the width is 0.8 mm. The expansion section and the projection of the image field on the waveguide plane partly overlap so that the overall length becomes 1.6 mm+0.7 mm·cos(53°)=2 mm.

Figure 5:
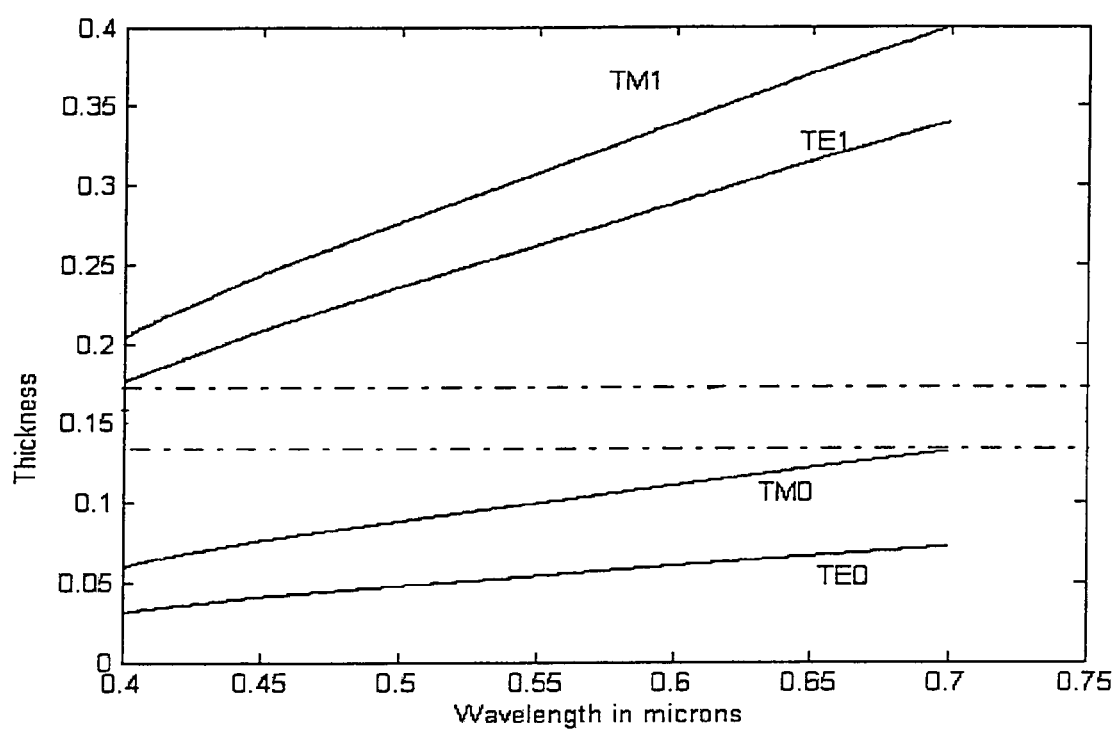
FIG. 5 is a graphical representation of the critical thickness for the lowest order modes in a thin film waveguide as a function of wavelength.

The planar waveguide should be single-mode in the entire spectral range of interest. FIG. 5 shows the critical thickness for the lowest order modes in a thin film waveguide as a function of wavelength. In this example, the waveguide comprises hafnium oxide on a fused quartz substrate. Film thickness in the range of 0.13 to 0.17 corresponds to a single-mode waveguide.

Figure 6:
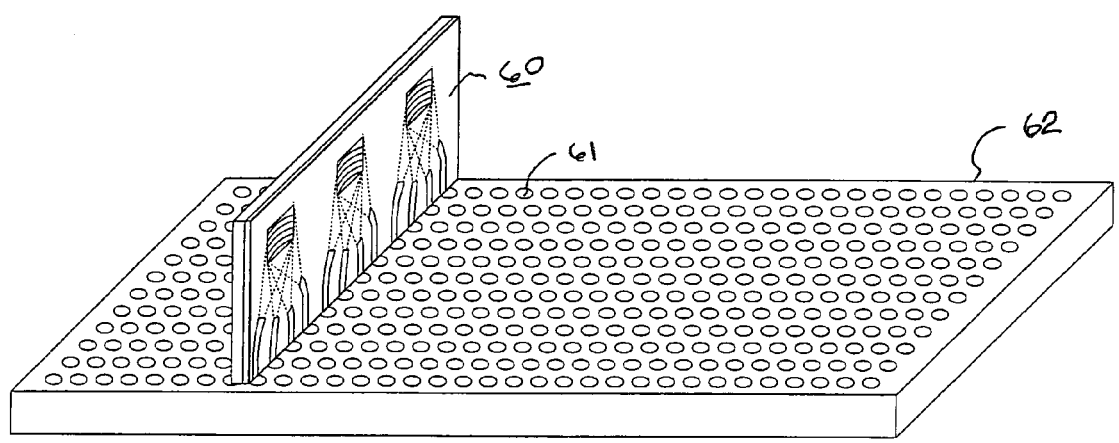
FIG. 6 is a schematic representation of a DIS, in accordance with the invention, in use as a reader for a microarray containing biological samples.

In addition to being used as a conventional device for spectral analysis, this extremely compact DIS 60 can be used as a reader for microarrays, as illustrated in FIG. 6. It is expected that by detecting the entire fluorescence spectrum, in every spot 61 of the microarray 62, one can improve the reliability of readings.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A diffractive imaging spectrometer comprising:
   an input for receiving an input optical signal;
   a diffractive optical element for collimating the input optical signal, subjecting the input optical signal to a diffraction grating, and producing a focused output signal; and
   an aberration correction prism for constituting a focusing surface on which an output image responsive to the focused output signal is produced.

2. The diffractive imaging spectrometer of claim 1, wherein there is further provided an image sensor having an input for receiving the output image, and an output producing an image electrical signal responsive to the output image.

3. The diffractive imaging spectrometer of claim 2, wherein said image sensor is a charge coupled device (CCD).

4. The diffractive imaging spectrometer of claim 2, wherein said image sensor is a complimentary metal-oxide-semiconductor (CMOS) image sensor.

5. The diffractive imaging spectrometer of claim 2, wherein said aberration correction prism is arranged to provide mechanical support for said image sensor.

6. The diffractive imaging spectrometer of claim 1, wherein said input comprises a plurality of waveguide channels.

7. The diffractive imaging spectrometer of claim 6, wherein said plurality of waveguide channels are separated from one another to achieve separation of focused output signals at said image sensor.

8. The diffractive imaging spectrometer of claim 6, wherein said plurality of waveguide channels are arranged to propagate respective input optical signals to said diffractive optical element.

9. The diffractive imaging spectrometer of claim 1, wherein said aberration prism is arranged at an optimized angle with respect to said diffractive optical element.

10. The diffractive imaging spectrometer of claim 9, wherein the optimized angle with respect to said diffractive optical element is approximately between 45° and 60°.

11. The diffractive imaging spectrometer of claim 9, wherein the optimized angle with respect to said diffractive optical element is approximately between 51° and 55°.

12. The diffractive imaging spectrometer of claim 1, wherein said diffractive optical element has a length that is dimensioned approximately 80 μm.

* * * * *